United States Patent
Kopp et al.

(10) Patent No.: US 7,948,615 B2
(45) Date of Patent: May 24, 2011

(54) NON-DESTRUCTIVE TESTING OF AN INTEGRATED OPTICAL COUPLER IN AN INTEGRATED OPTICAL CIRCUIT

(75) Inventors: Christophe Kopp, Fontanil-Cornillon (FR); Philippe Grosse, Sassenage (FR); Regis Orobtchouk, Fitilieu (FR)

(73) Assignees: Commissariat a l'Energie Atomique, Paris (FR); Institut National des Sciences Appliquees de Lyon, Villeurbanne Cedex (FR)

( * ) Notice: Subject to any disclaimer, the term of this patent is extended or adjusted under 35 U.S.C. 154(b) by 239 days.

(21) Appl. No.: 12/423,175

(22) Filed: Apr. 14, 2009

(65) Prior Publication Data

US 2009/0262336 A1 Oct. 22, 2009

(30) Foreign Application Priority Data

Apr. 15, 2008 (FR) .................. 08 52505

(51) Int. Cl.
G01N 21/00 (2006.01)
(52) U.S. Cl. .................. 356/73.1
(58) Field of Classification Search .......... None
See application file for complete search history.

(56) References Cited

U.S. PATENT DOCUMENTS

| | | | |
|---|---|---|---|
| 5,781,670 A | 7/1998 | Deacon | |
| 5,991,048 A | 11/1999 | Karlsen | |
| 6,826,223 B1 | 11/2004 | Meyer | |
| 6,898,337 B2 * | 5/2005 | Averett et al. | 385/12 |
| 7,372,554 B1 * | 5/2008 | Birk et al. | 356/73.1 |
| 2002/0181867 A1 | 12/2002 | Chan | |
| 2004/0246490 A1 | 12/2004 | Wang | |
| 2005/0046850 A1 | 3/2005 | Chow | |
| 2007/0146721 A1 | 6/2007 | Barcelos | |

FOREIGN PATENT DOCUMENTS

| | | |
|---|---|---|
| WO | 9926106 A | 3/1999 |
| WO | 0246816 A | 6/2002 |

OTHER PUBLICATIONS

"Search Report" issued by the French Patent Office on Jan. 29, 2009.

\* cited by examiner

*Primary Examiner* — Tu T Nguyen
(74) *Attorney, Agent, or Firm* — Vedder Price PC

(57) ABSTRACT

A non-destructive method for characterizing a surface-illuminated integrated optical coupler associated with an optical waveguide, comprising the steps of measuring the reflection coefficient on a first region of the coupler at a distance from the optical waveguide and constructing a first curve, determining a first model of the reflection coefficient on the first region, performing a first parameter fitting between the first curve and the first model to determine first parameters, measuring the reflection coefficient on a second region of the coupler close to the guide, and constructing a second curve, determining a second model of the reflection coefficient on the second region, performing a second parameter fitting between the second curve and the second model to determine second parameters, and constructing the characteristic of the coupling efficiency of the coupler using the first and second parameters.

7 Claims, 4 Drawing Sheets

NON-DESTRUCTIVE TESTING OF AN INTEGRATED OPTICAL COUPLER IN AN INTEGRATED OPTICAL CIRCUIT

BACKGROUND OF THE INVENTION

1. Field of the Invention

The present invention relates to the testing of integrated optical circuits.

More specifically, the present invention relates to a method of characterization and non-destructive testing of an optical coupler associated with an integrated optical or optoelectronic circuit.

2. Discussion of the Related Art

Currently, integrated optical circuits are being more and more used in the field of telecommunications, especially for the transmission, the processing, or the storage of data. Integrated optical circuits may have many functions, such as multiplexing, demultiplexing, modulation, demodulation, spectral routing, amplification, storage, filtering, resonator . . . .

Integrated optical circuits are generally formed on and inside of wafers similar to those used in microelectronics. An integrated optical circuit comprises one or several elementary optical components processing one or several light beams. An integrated optical circuit is associated with optical couplers of introduction and/or extraction of a light beam into optical input and/or output waveguides.

The introduction and/or extraction of light is often performed through the edge of the chip on which the integrated optical circuits are formed. To test such circuits, it is thus necessary to separate each chip formed on a wafer. The test is then carried out on each individual chip by introducing a light beam through the chip edge.

Other types of couplers have been provided, such couplers being arranged at the surface of a wafer and being intended to receive and/or send light under a high incidence (greater than 45°) with respect to the wafer plane. For example, such couplers, which will be called surface-illuminated couplers herein, may be formed of a diffraction grating comprising an alternation of strips having different reflection coefficients or a succession of trenches formed in the wafer. In practice, the testing of circuits comprising surface-illuminated couplers is also carried out on diced chips, as is done for edge-illuminated chips.

As in the case of wafers comprising integrated electronic circuits, it is desired to test integrated optical circuits directly on the wafer on which they are formed, before dicing.

More specifically, there is a need for a method for testing a surface-illuminated optical coupler only involving measurements performed on a single surface of the wafer.

SUMMARY OF THE INVENTION

An embodiment of the present invention provides a method for characterizing a surface-illuminated optical coupler formed on a wafer, this method only requiring reflection measurements on a surface of the wafer.

Thus, an embodiment of the present invention provides a non-destructive method for characterizing an integrated optical coupler of surface-illuminated, diffraction grating type, and introducing light into an optical waveguide, comprising the steps of:

performing a first measurement of the reflection coefficient, as a function of the wavelength, on a first region of the coupler located at a distance from the optical waveguide, to construct a first curve;

determining a first model of the reflection coefficient, as a function of the wavelength, on the first region, the first model depending on first parameters, and performing a first parameter fitting between the first curve and the first model to determine the first parameters;

performing a second measurement of the reflection coefficient, as a function of the wavelength, on a second region of the coupler sufficiently close to the optical wave-guide for a portion of the incident light beam to be introduced into the optical waveguide, to construct a second curve;

determining a second model of the reflection coefficient, as a function of the wavelength, on the second region, the second model depending on the first parameters and on second parameters, and performing a second parameter fitting between the second curve and the second model to determine the second parameters; and constructing the characteristic of the coupling efficiency of the optical coupler as a function of the wavelength by using the first and second parameters.

According to an embodiment, the first and second measurements of the reflection coefficients are performed by means of a same measurement device comprising a first optical fiber providing a light beam of given wavelength on a surface and a second optical fiber, immovably attached to the first one, arranged to receive the light originating from the first optical fiber and reflecting on the surface, the first and second optical fibers being placed symmetrically with respect to the normal to the surface.

According to an embodiment, the method comprises a step of calibration of the measurement device in which the measurement device is arranged to illuminate a fully-reflective surface.

According to an embodiment, the first and second parameter fittings are non-linear Levenberg Marquardt fittings.

According to an embodiment, the first model of the reflection coefficient can be written as:

$$R_1(\lambda) = \frac{\int_{-\infty}^{+\infty} |r_1(z)|^2 \, dz}{P_{inc}},$$

where:

$P_{inc}$ is the power supplied by the first optical fiber;

$r_1(z)$ illustrates the profile of the reflected light beam, which can be written as:

$$r_1(z) = \int_{-\infty}^{+\infty} p(k_z) r_r(k_z) \exp(i k_z z) \, dk_z,$$

where:

$k_z$ is the propagation coefficient in the direction of the guide of the considered plane wave;

$p(k_z)$ represents the plane-wave decomposition of the incident Gaussian light beam, and $r_r(k_z)$ is the amplitude reflection coefficient of the plane wave on the coupler, which can be written as:

$$r_r(k_z) = r_0 \frac{k_z - k'_{z,z1}}{k_z - k'_{z,p} - i k''_{z,p}},$$

where:

$r_0$ and $k'_{z,z1}$, $k'_{z,p}$, and $k''_{z,p}$ are the first parameters to be determined.

According to an embodiment, the second model of the reflection coefficient can be written as:

$$R_2(\lambda) = \frac{\int_{-\infty}^{+\infty} |r_2(z)|^2 \, dz}{P_{inc}},$$

where:

$r_2(z)$ designates the profile of the reflected light beam, which can be written as:

$$r_2(z) = \int_{-\infty}^{0} p(k_z) r_r(k_z) \exp(ik_z z) \, dk_z + \int_{0}^{+\infty} p(k_z) r_g(k_z) \exp(ik_z z) \, dk_z,$$

where:

rg(kz) is the amplitude reflection coefficient of the plane wave on the waveguide, which can be written as, if the waveguide is of silicon-on-insulator type:

$$r_g(k_z) = a \cos\left(\frac{2\pi}{\lambda} b + c\right),$$

where:

a, b, and c are the second parameters to be determined.

According to an embodiment, the characteristic of the coupling efficiency of the optical coupler is constructed by carrying out the steps of:

determining the transmission coefficient, as a function of the wavelength, on the second region based on the first and on the second parameters; and determining the coupling efficiency of the coupler, which is equal to 1 minus the transmission coefficient on the second region minus the reflection coefficient on the second region.

An embodiment further provides a method for testing an integrated optical circuit comprising the steps of:

associating with the optical circuit at least one input coupler and at least one output coupler of surface-illuminated, diffraction grating type;

characterizing the input coupler and/or the output coupler by a method such as described hereinabove; and measuring the ratio between a light intensity introduced into the input coupler and a light intensity extracted from the output coupler and deducing therefrom the transmission of the optical circuit, taking into account the characteristics of the input and output couplers.

The foregoing objects, features, and advantages of the present invention will be discussed in detail in the following non-limiting description of specific embodiments in connection with the accompanying drawings.

DETAILED DESCRIPTION

Figure 1:
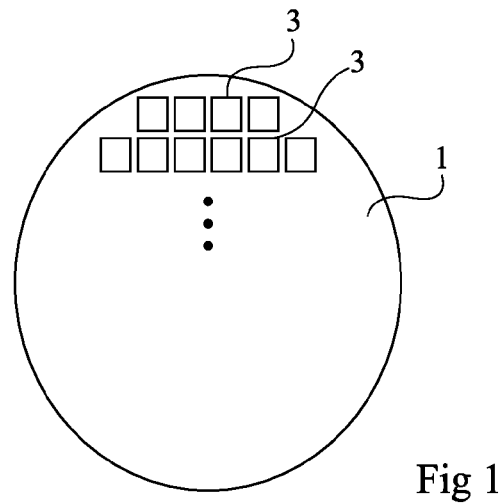
FIG. 1 shows a wafer on which chips are formed.

For clarity, the same elements have been designated with the same reference numerals in the different drawings and further, as usual, the various drawings are not to scale.

Generally, to characterize an integrated optical circuit, light is injected onto an input coupler, light is collected from an output coupler, and the transmission is measured as a function of the wavelength. Since the input and/or output couplers having a non-negligible influence, it is desirable to characterize them independently to isolate the circuit characteristics. It is here provided to characterize the couplers in situ on the wafer to take into account possible variations from one coupler to another.

When a light beam reaches a surface-illuminated coupler formed on a wafer, it is divided into a reflected portion, a portion transmitted under the coupler, and a portion injected, for example, into an optical waveguide. To characterize the portion injected into an optical waveguide by the coupler, it is thus a priori necessary to measure the portion reflected on the coupler, to measure the portion transmitted under the coupler, and to then calculate the injected portion by calculating the difference between the incident beam and the reflected and transmitted beams.

However, when the coupler is located on a wafer, measuring the portion transmitted under the coupler poses several problems. First, the thickness of the wafer and of possible patterns formed on or in the wafer introduce artifacts on the transmitted light beam. A measurement performed on the rear surface of a wafer is thus distorted by such artifacts. Further, even if the measurement finally turned to be of good quality, it is not handy to perform tests on the front and rear surfaces of a wafer. It should be noted that conventional test frames in microelectronics do not enable to carry out measurements on the rear surface of a wafer.

A method according to an embodiment of the present invention thus provides characterizing a surface-illuminated optical coupler formed on a wafer by only performing measurements on the front surface of the wafer.

FIG. 1 shows a wafer 1 on which several chips 3 are formed. Each chip 3 comprises at least one integrated optical component and possibly, for example, electronic, magnetic, and/or mechanical components. Wafer 1 may be made of any material conventionally used to form such components, for example a semiconductor material (silicon, SiGe, GaAs . . . ) formed or not on an insulating layer. It may also be made of glass. Chips 3 are generally identical.

Figure 2:
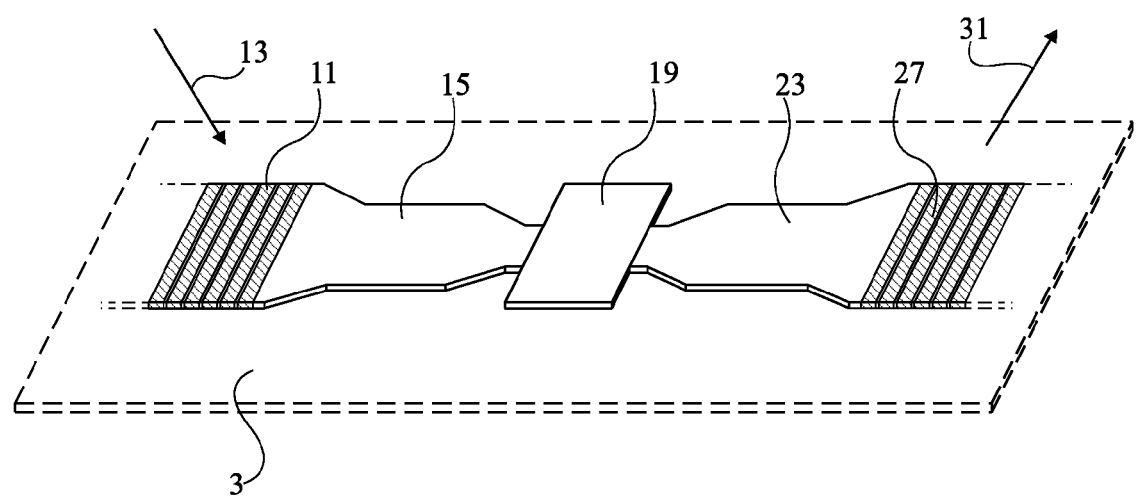
FIG. 2 shows an example of an integrated optical circuit.

FIG. 2 shows an example of an integrated optical circuit that may be formed on a chip 3.

The circuit of FIG. 2 comprises an integrated input optical coupler 11 of surface-illuminated, diffraction grating type. Coupler 11 receives an incident light beam on its surface, shown in FIG. 2 by an arrow 13. Coupler 11 introduces, under certain conditions, a portion of light beam 13 into a waveguide 15. Waveguide 15 transmits the light that it receives to an integrated optical circuit 19 which may have any passive or active optical function. The output of integrated optical circuit 19 is provided to an optical waveguide 23 having its output connected to an output coupler 27. Output coupler 27 turns the light arriving through waveguide 23 into an output light beam, schematized in FIG. 2 by an arrow 31. As an example, light beam 13 may be conveyed by an optical fiber and light beam 31 may be intended to be transported by another optical fiber. It should also be noted that one at least of couplers 11, 27 may have an input/output function.

Figure 3:
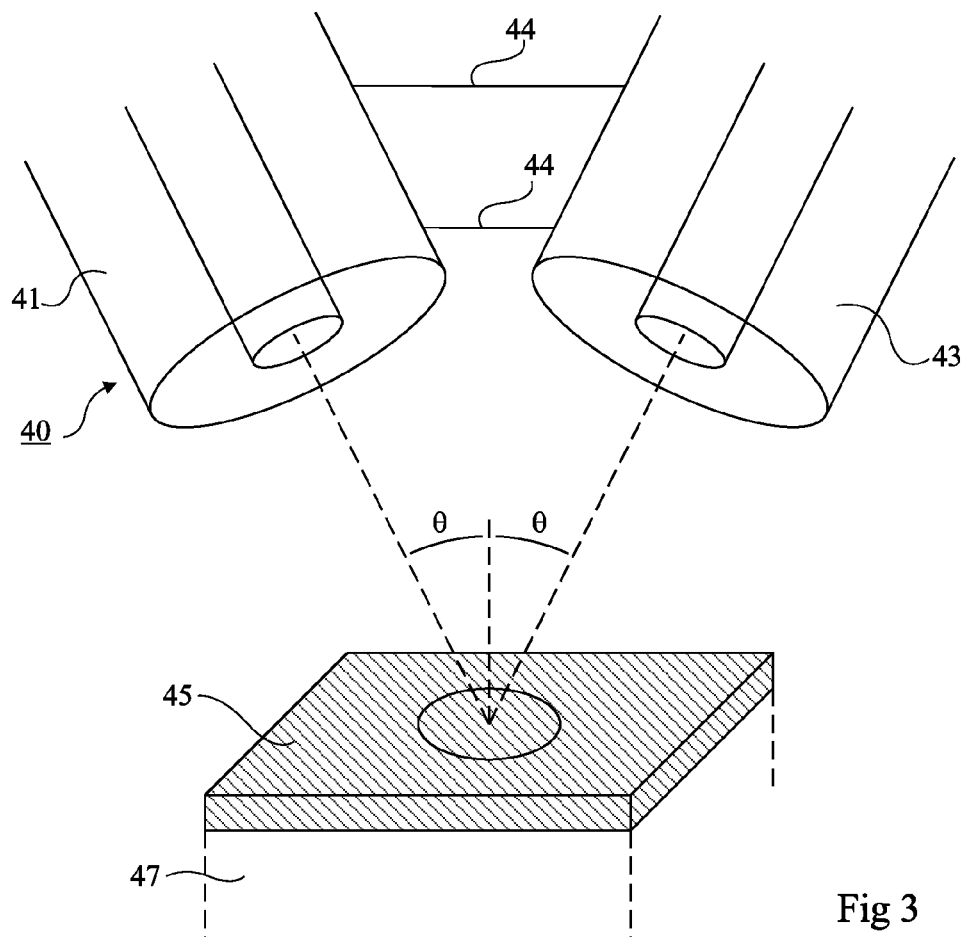
FIG. 3 shows a device for measuring the reflection coefficient of a surface according to an embodiment of the present invention.

FIG. 3 shows a measurement device according to an embodiment of the present invention.

The measurement device comprises an integral assembly 40 formed of two optical fibers 41 and 43. The connection between the fibers is symbolized by lines 44. Assembly 40 will be called optical measurement probe hereinafter. Optical fibers 41 and 43 are positioned symmetrically with respect to a vertical axis and along a direction forming an angle θ with respect to this vertical axis. As an example, angle θ may be on the order of from 10 to 20°, for example, 14°. Optical measurement probe 40 is intended to be placed opposite to a surface so that optical fiber 41 provides a light beam directed towards the surface and that optical fiber 43 receives the light reflected by the surface.

To calibrate an optical measurement probe 40, optical fibers 41 and 43 are positioned with respect to a fully-reflective surface 45 formed on a support 47. The ratio between the reflected intensity and the incident intensity is then measured over a wavelength range. This measurement enables to know, as a function of the wavelength, the coupling rate between optical fibers 41 and 43 of optical measurement probe 40. This coupling rate can then be used to normalize the measurements performed by means of the optical measurement probe.

The method according to an embodiment provides, once the calibration has been performed, using optical measurement probe 40 to perform two measurements at specific points of a coupler. Due to the two measurements, a number of parameters which enable to obtain the amount of light introduced by the coupler into a waveguide as a function of the wavelength are determined. These measurements will be described hereafter in relation with FIGS. 4 to 9.

Figure 4:
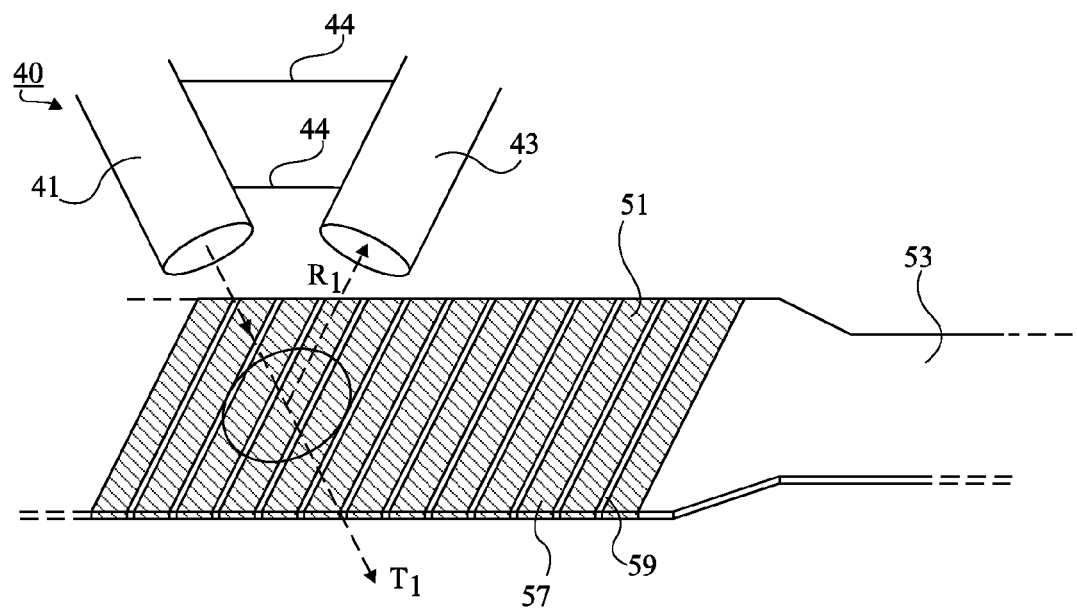
FIG. 4 illustrates the performing of a first measurement according to an embodiment of the method of the present invention.

FIG. 4 illustrates a surface-illuminated coupler to be characterized, associated with an optical waveguide, and the performing of a first measurement on this coupler.

A surface-illuminated optical coupler 51 having its output connected to an optical waveguide 53 is considered. Coupler 51 comprises a diffraction grating formed, for example, of an alternation of first strips 57 and of second strips 59 having different reflection coefficients. Of course, any type of surface-illuminated, grating optical coupler may be characterized by the method described herein.

As an example of numerical values, the coupler may have a width of approximately 20 μm and a length of approximately 100 μm. The pitch of the diffraction grating may be equal to approximately 0.5 μm if the wavelength of the light to be introduced/extracted is on the order of 1 μm. The light beam provided by optical fiber 41 of optical measurement probe 40 can then have a diameter of approximately 10 μm.

The first measurement is performed by arranging optical measurement probe 40 (optical fibers 41 and 43) so that the incident light beam reaches the surface of coupler 51 at a distance from the interface between coupler 51 and optical waveguide 53. In this configuration, no light is introduced into waveguide 53. The light provided by optical fiber 41 thus divides into a portion reflected on the coupler surface and a portion transmitted under the coupler. In FIG. 4, the reflection is illustrated by an arrow $R_1$ directed towards optical fiber 43 and the transmission is indicated by an arrow $T_1$ aligned with the direction of optical fiber 41. A diffraction grating having a pitch such that there exists only one diffracted beam corresponding to order +1 or −1 which enables to inject light into the guide will be selected.

Figure 5:
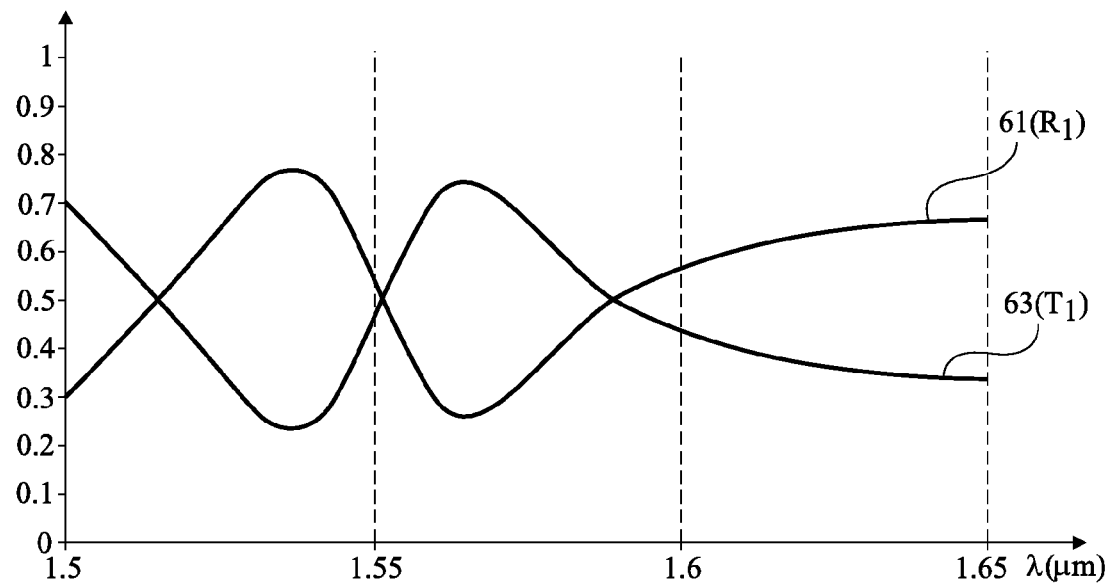
FIG. 5 shows a reflection curve resulting from the measurement of FIG. 4 and the corresponding attenuation curve.

FIG. 5 shows a curve 61 of the reflected power $R_1$ resulting from the measurement described in relation with FIG. 4, as a function of the wavelength, in the near infrared, between 1.5 and 1.65 μm. Curve 61 exhibits a reflection maximum of approximately 0.78 for a wavelength of 1.53 μm and a reflection minimum of approximately 0.25 for a wavelength of approximately 1.57 μm. In the selected conditions where no light is provided to optical waveguide 53 by coupler 51, sum $R_1+T_1$ of the reflected power and of the transmitted power is equal to 1. A curve 63 of transmission $T_1$ as a function of the wavelength can thus be plotted, based on curve 61, by using the following equation: $T_1=1-R_1$.

The method according to an embodiment provides creating a model of the reflection in the case of the first measurement. To obtain the response of the grating to a Gaussian beam, a plane-wave decomposition of the incident beam is performed, which enables to come down to handling the case of an infinite plane wave. Adding up all these planar waves enables to describe the coupling phenomenon in the case of a beam of limited extent in the form of an integral, which requires calculation routines of Fast Fourier Transform type (FFT) to be solved. The theoretical reflection coefficient is given by:

$$R_1(\lambda) = \frac{\int_{-\infty}^{+\infty} |r_1(z)|^2 dz}{P_{inc}}, \quad (1)$$

where:

$P_{inc}$ is the power provided by optical fiber 41 (determined in the initial measurement step), and $r_1(z)$ designates the profile of the reflected light beam which has, in this model, the following form:

$$r_1(z) = \int_{-\infty}^{+\infty} p(k_z) r_r(k_z) \exp(ik_z z) dk_z, \quad (2)$$

where:

$k_z$ is the propagation coefficient in the direction of the guide of the considered plane wave, p(kz) represents the plane-wave decomposition of the incident Gaussian light beam, and $r_r(k_z)$ is the amplitude reflection coefficient of the plane wave on the coupler.

Amplitude reflection coefficient $r_r(k_z)$ may be written as an analytic function comprising a zero, a pole representative of the guided mode, and a constant which corresponds to the reflection coefficient in the absence of the coupling network, that is:

$$r_r(k_z) = r_0 \frac{k_z - k'_{z,z1}}{k_z - k'_{z,p} - ik''_{z,p}}, \quad (3)$$

where:

$r_0$ and $k'_{z,z1}$ are coefficients to be determined, and $k'_{z,p}$ and $k''_{z,p}$ are, respectively, the real and imaginary parts of a parameter, $k_{z,p}$, characterizing the wave in guided mode which propagates under the diffraction grating, these real and imaginary parts having to be determined.

A non-linear Levenberg Marquardt parameter fitting method enables to obtain the values of parameters $r_0$, $k_{z,p}$, and $k_{z,z1}$ by comparing the model of reflection coefficient $R_1$ to curve 61.

In the same way as for the reflection, the profile of the transmitted light beam can be written as:

$$t_r(k_z) = t_0 \frac{k_z - k'_{z,z2}}{k_z - k'_{z,p} - ik''_{z,p}}, \qquad (4)$$

where:

$k'_{z,z2}$ and to are coefficients to be determined.

Using the fact that the energy balance is even ($R_1+T_1=1$), parameters $t_0$ and $k'_{z,z2}$ can be easily obtained.

It should be noted that parameters $t_0$ and $k'_{z,z2}$ can also be obtained by a non-linear Levenberg Marquardt parameter fitting method, using curve 63. However, the use of the energy balance enables to obtain these parameters while limiting the amount of calculations to be performed.

Thus, using the measurement described in relation with FIG. 4, a complete description of the reflection and transmission phenomena at the level of the diffractive portion of coupler 51 can be obtained by simple and fast calculations.

The quadrennial activity report of the Charles Fabry laboratory of the Institut d'Optique (2001-2004 report, downloadable from Internet site http://www.institutoptique.fr) indicates that the RCWA (Rigorous Coupled-Wave Analysis) method is the most currently used method for the analysis of diffraction gratings. To calculate the reflection coefficient of a diffraction grating for a plane wave, this method requires the knowing of parameters of the diffraction grating (step, modulation depth, filling factor, and grating shape) and of the structure (refraction index, thickness of the different layers). In the simple case of a diffraction grating formed in a guide layer deposited on a substrate, at least eight parameters must be known.

With the method described herein the knowing of the geometric parameters of the grating is made unnecessary by the determination of an analytic function which only depends on four parameters, whatever the considered structure (r0, k'z, z1, k'z,p, k"z,p). The decrease in the number of parameters to be determined thus divides the acquisition time by two. Further, the determination of an analytic function instead of the use of an RCWA method to calculate the reflection coefficient of the plane wave of equation 2 enables to divide the calculation time by a factor 10.

For the above reasons, calculation times are thus divided by a factor 20. In practice, a parameter fitting using an RCWA code appears to generally last for several hours, while a fitting procedure using the analytic model discussed herein lasts for less than three minutes.

Further, to obtain the parameters of the transmission coefficient, it is directly worked with the plane wave curve. The use of the analytic function thus enables to directly invert equation 4 and to calculate parameters k'z,z2 and t0 based on 2 properly-selected points of the experimental curve (thus resulting in a very short calculation time, shorter than one thousandth of a second, to obtain these parameters). The calculation times obtained due to the present invention are thus compatible with a fast component testing procedure in an industrial environment.

Figure 6:
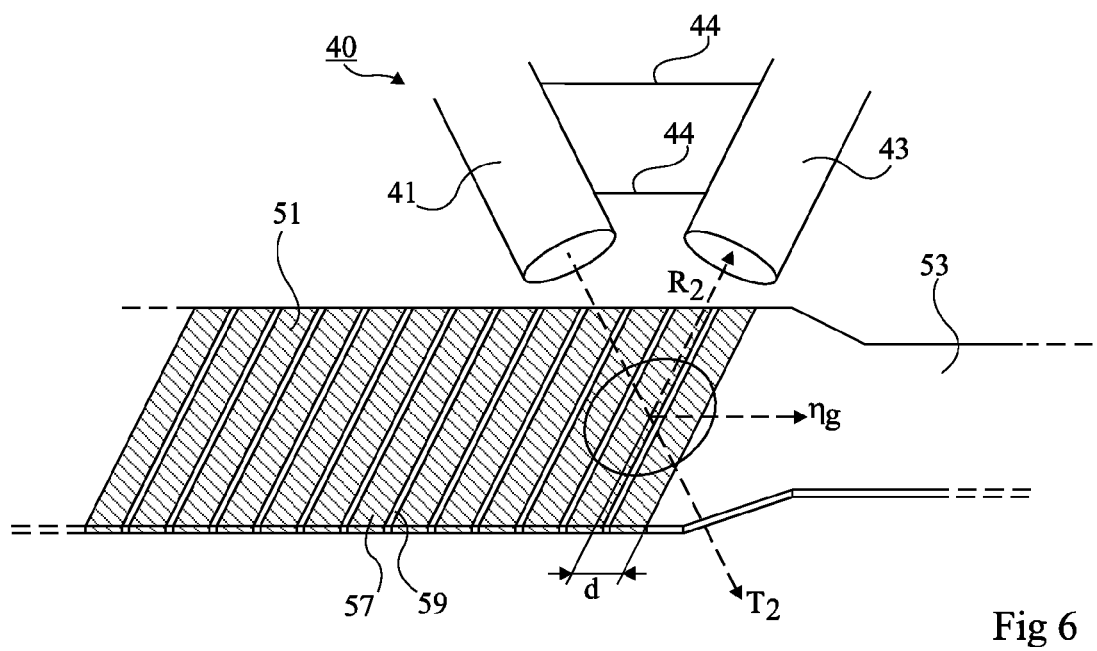
FIG. 6 illustrates the performing of a second measurement according to an embodiment of the method of the present invention.

FIG. 6 illustrates the performing of a second measurement according to an embodiment of the method of the present invention on a coupler such as that of FIG. 4.

The second measurement is performed by arranging optical measurement probe 40 (optical fibers 41 and 43) so that the incident light beam reaches the surface of coupler 51 in the interface region between coupler 51 and optical waveguide 53. More specifically, the center of the light beam provided by optical fiber 41 is located on the grating at a distance d from the interface with optical waveguide 53 which is slightly shorter than the diameter of the incident light beam. In the case of the previously-described numerical examples, distance d may be on the order of 4 μm.

When the optical measurement probe is positioned as described hereabove, the incident light beam provided by optical fiber 41 divides into:

a portion which is reflected towards optical fiber 43 (arrow R2), a portion which is transmitted under the coupler (arrow T2), and a portion which is introduced into optical waveguide 53 (arrow ηg).

Figure 7:
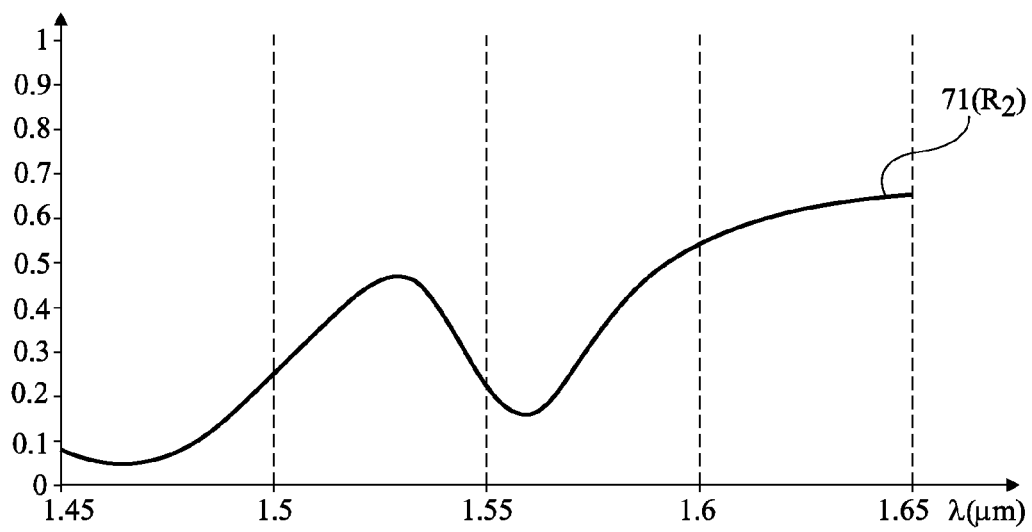
FIG. 7 shows a reflection curve resulting from the measurement of FIG. 6.

FIG. 7 shows a curve 71 of the reflected power R2 resulting from the measurement described in relation with FIG. 6, as a function of the wavelength, in the near infrared. Curve 71 exhibits a reflection maximum of approximately 0.47 at a wavelength of approximately 1.53 μm and a reflection minimum of approximately 0.16 at a wavelength of approximately 1.56 μm.

The described method provides building a model of the reflection in the case of the second measurement. In the same way as for the model of the first measurement, the incident beam is decomposed into plane waves. The theoretical reflection coefficient is given by:

$$R_2(\lambda) = \frac{\int_{-\infty}^{+\infty} |r_2(z)|^2 dz}{P_{inc}}. \qquad (1')$$

The profile of reflected beam $r_2(z)$ depends on the sum of the two integrals, the first one representing the portion of the light beam which is reflected on optical coupler 51 and the second one representing the portion of the light beam which is reflected on optical waveguide 53. Considering that the edge of the coupler, that is, the separation between coupler 51 and waveguide 53, is at abscissa z=0, the profile of reflected light beam $r_2(z)$ is the following:

$$r_2(z) = \int_{-\infty}^{0} p(k_z)r_r(k_z)\exp(ik_z z)dk_z + \int_{0}^{+\infty} p(k_z)r_g(k_z)\exp(ik_z z)dk_z, \qquad (5)$$

where:

kz is the propagation coefficient in the direction of the guide of the considered plane wave, p(kz) represents the plane-wave decomposition of the incident Gaussian light beam, rr(kz) is the amplitude reflection coefficient of the plane wave on the coupler, and rg(kz) is the amplitude reflection coefficient of the plane wave on the waveguide, which is to be determined.

Due to the first measurement of FIG. 4 and to the calculations performed in relation with this measurement, the amplitude reflection coefficient of the plane wave on coupler $r_r(k_z)$ is known.

According to the type of waveguide 53 used, a model of the amplitude reflection coefficient on waveguide $r_g(k_z)$ can be determined. For example, in the case of a waveguide of silicon-on-insulator type, the amplitude reflection coefficient $r_g(k_z)$ of the waveguide is:

$$r_g(k_z) = a\cos\left(\frac{2\pi}{\lambda}b + c\right), \quad (6)$$

where:
a, b, and c are parameters to be determined.

A non-linear Levenberg Marquardt parameter fitting method enables to obtain the value of parameters a, b and c by comparing the model of reflection coefficient $R_2$ with curve 71. Due to this non-linear parameter fitting, a value of distance d is also obtained, this parameter intervening in the expression of the plane-wave decomposition of the incident Gaussian light beam $p(k_z)$.

Whatever the type of the used waveguide, a model of its amplitude reflection coefficient as a function of parameters which are subsequently determined by parameter fitting can be determined.

In the same way, the profile of the transmitted light beam is as follows:

$$t_2(z) = \int_{-\infty}^{0} p(k_z)t_r(k_z)\exp(ik_z z)dk_z + \int_{0}^{+\infty} p(k_z)t_g(k_z)\exp(ik_z z)dk_z, \quad (7)$$

where:
tr(kz) is the amplitude transmission coefficient on the coupler, and
tg(kz) is the amplitude transmission coefficient on the waveguide, which is to be determined.

Due to the first measurement of FIG. 4 and to the calculations performed in relation with this measurement, function $t_r(k_z)$ is known.

The amplitude transmission coefficient on the waveguide being known, the amplitude transmission coefficient on the waveguide can be calculated by using the following relation:

$$t_g(k_z) = \sqrt{1 - r_g^2(k_z)}. \quad (8)$$

Thus, by using formula (7), an analytic expression of the profile of the transmitted light beam $t_2(z)$ is obtained. Transmission coefficient $T_2$ can then be calculated by using the following formula:

$$T_2(\lambda) = \frac{\int_{-\infty}^{+\infty}|t_2(z)|^2 dz}{P_{inc}}. \quad (9)$$

Figure 8:
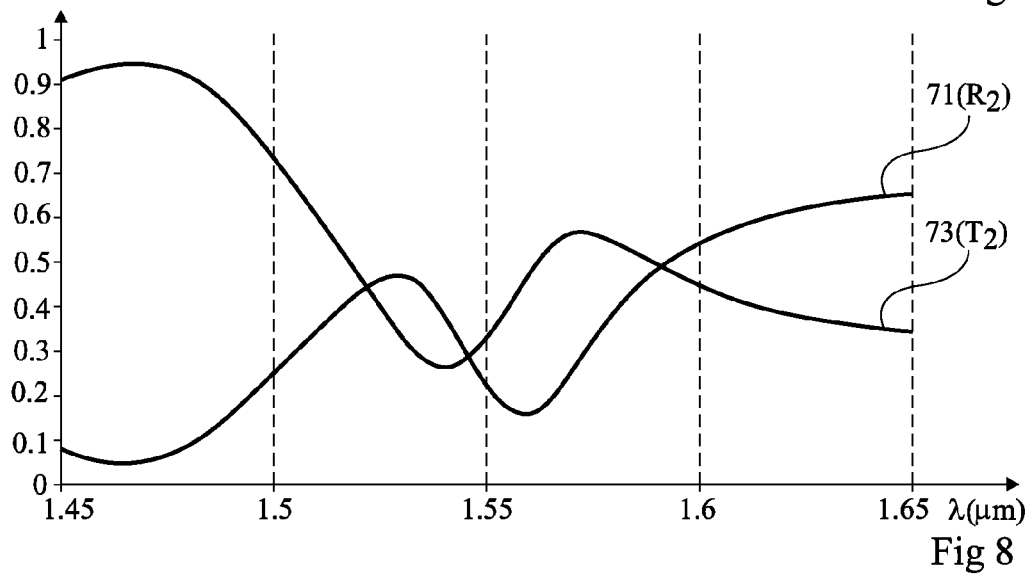
FIGS. 8 and 9 illustrate curves resulting from digital processings according to an embodiment of the method of the present invention.
Figure 9:
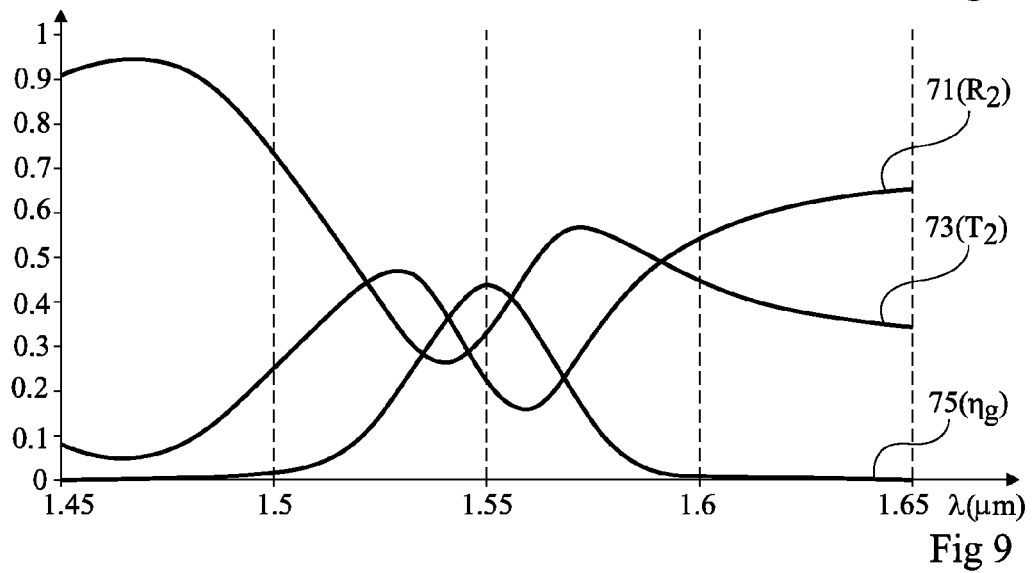

FIGS. 8 and 9 show curves resulting from the digital processings of the method according to an embodiment of the present invention. FIG. 8 shows curve 71 and also shows a curve 73 of transmission coefficient $T_2$ obtained by the previously-described calculations.

In the case of the second measurement, the system balance provides: $R_2+T_2+\eta_g=1$, $\eta_g$ being the coupling efficiency of the coupler in the waveguide. The previous steps having provided $R_2$ and $T_2$, coupling efficiency $\eta_g$ of coupler 51 can thus easily be determined.

FIG. 9 shows curves 71 and 73 and also shows a curve 75 of coupling efficiency $\eta_g$ of the coupler.

Coupling efficiency $\eta_g$ of the coupler in the waveguide is thus determined by a parameter extraction method which requires but two measurements of the reflection coefficient on the coupler. The described method thus enables to characterize an optical coupler rapidly and directly on a wafer, before the wafer has been diced, and by only performing reflection measurements on one surface of the wafer.

Thus, an integrated optical circuit associated with surface-illuminated input and/or output couplers can be tested by carrying out the steps of:
characterizing the input coupler(s) of the optical circuit;
characterizing the output coupler(s) of the optical circuit;
measuring the ratio between a light intensity introduced into the input coupler and a light intensity extracted from the output coupler; and
deducing the transmission of the optical circuit by taking into account the characteristics of the input and output couplers.

The testing of an edge-illuminated integrated optical circuit by means of the characterization method discussed herein may also be provided. In this case, a surface-illuminated input coupler and a surface-illuminated output coupler are placed on the support of the circuit to be tested. The input and output couplers are respectively connected to the input and to the output of the circuit, in parallel with light transport systems used in the normal operation. The input and output couplers are then characterized by following the method described herein and the optical circuit is thus tested. The input and output couplers added for the test may be formed in a cutting area of the wafer in which the circuits are formed.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A non-destructive method for characterizing, by a measurement device comprising an optical measurement probe, an integrated optical coupler of surface-illuminated (51), diffraction grating type, and introducing light into an optical waveguide (53), comprising the steps of:
performing, by the optical measurement probe, a first measurement of the reflection coefficient ($R_1$), as a function of the wavelength, on a first region of the coupler located at a distance from the optical waveguide, to construct a first curve (61);
determining, by the measurement device, a first model of the reflection coefficient (R1), as a function of the wavelength, on the first region, the first model depending on first parameters ($r_0$, $k'_{z,p}$, $k''_{z,p}$, $k'_{z,z1}$), and performing a first parameter fitting between the first curve and the first model to determine the first parameters;
performing, by the optical measurement probe, a second measurement of the reflection coefficient ($R_2$), as a function of the wavelength, on a second region of the coupler sufficiently close to the optical waveguide for a portion of the incident light beam to be introduced into the optical waveguide, to construct a second curve (71);
determining, by the measurement device, a second model of the reflection coefficient ($R_2$), as a function of the wavelength, on the second region, the second model depending on the first parameters and on second parameters (a, b, c), and performing a second parameter fitting between the second curve and the second model to determine the second parameters; and constructing, by the measurement device, the characteristic of the coupling efficiency ($\eta_g$) of the optical coupler as a function of the wavelength by using the first and second parameters.

2. The method of claim 1, wherein the first and second measurements of the reflection coefficients are performed by means of a same measurement device (40) comprising a first optical fiber (41) providing a light beam of given wavelength on a region and a second optical fiber (43), immovably attached to the first one, arranged to receive the light originating from the first optical fiber and reflecting on the region, the first and second optical fibers being placed symmetrically with respect to the normal to the region.

3. The method of claim 2, comprising a step of calibration of the measurement device (40) wherein the measurement device is arranged to illuminate a fully-reflective surface.

4. The method of claim 1, wherein the first and second parameter fittings are non-linear Levenberg Marquardt fittings.

5. The method of claim 2, wherein the first model of the reflection coefficient ($R_1$) can be written as:

$$R_1(\lambda) = \frac{\int_{-\infty}^{+\infty} |r_1(z)|^2 dz}{P_{inc}},$$

where:

$P_{inc}$ is the power supplied by the first optical fiber (41);

$r_1(z)$ illustrates the profile of the reflected light beam, which can be written as:

$$r_1(z) = \int_{-\infty}^{+\infty} p(k_z) r_r(k_z) \exp(ik_z z) dk_z,$$

where:

$k_z$ is the propagation coefficient in the direction of the guide of the considered plane wave;

$p(k_z)$ represents the plane-wave decomposition of the incident Gaussian light beam, and $r_r(k_z)$ is the amplitude reflection coefficient of the plane wave on the coupler, which can be written as:

$$r_r(k_z) = r_0 \frac{k_z - k'_{z,z1}}{k_z - k'_{z,p} - ik''_{z,p}},$$

where:

$r_0$ and $k'_{z,z1}$, $k'_{z,p}$, and $k''_{z,p}$ are the first parameters to be determined.

6. The method of claim 5, wherein the second model of the reflection coefficient ($R_2$) can be written as:

$$R_2(\lambda) = \frac{\int_{-\infty}^{+\infty} |r_2(z)|^2 dz}{P_{inc}},$$

where:

$r_2(z)$ designates the profile of the reflected light beam, which can be written as:

$$r_2(z) = \int_{-\infty}^{0} p(k_z) r_r(k_z) \exp(ik_z z) dk_z + \int_{0}^{+\infty} p(k_z) r_g(k_z) \exp(ik_z z) dk_z,$$

where:

$r_g(k_z)$ is the amplitude reflection coefficient of the plane wave on the waveguide, which can be written as, if the waveguide is of silicon-on-insulator type:

$$r_g(k_z) = a \cos\left(\frac{2\pi}{\lambda} b + c\right),$$

where:

a, b, and c are the second parameters to be determined.

7. The method of claim 1, wherein the characteristic of the coupling efficiency ($\eta_g$) of the optical coupler is constructed by carrying out the steps of:

determining the transmission coefficient ($T_2$), as a function of the wavelength, on the second region based on the first and on the second parameters; and determining the coupling efficiency of the coupler, which is equal to 1 minus the transmission coefficient ($T_2$) on the second region minus the reflection coefficient ($R_2$) on the second region.

* * * * *